(12) United States Patent
Angelo et al.

(10) Patent No.: US 6,418,533 B2
(45) Date of Patent: *Jul. 9, 2002

(54) "J" SYSTEM FOR SECURING A PORTABLE COMPUTER WHICH OPTIONALLY REQUIRES AN ENTRY OF AN INVALID POWER ON PASSWORD (POP), BY FORCING AN ENTRY OF A VALID POP

(75) Inventors: Michael F. Angelo, Houston; Sompong P. Olarig, Cypress, both of TX (US)

(73) Assignee: Compaq Information Technologies Group, L.P., Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/927,096

(22) Filed: Aug. 29, 1997

(51) Int. Cl.[7] ............................. G06F 12/64; H04L 9/32
(52) U.S. Cl. ............................. 713/202; 713/1; 713/2; 713/100; 713/200
(58) Field of Search ............................. 713/200, 201–202, 713/1, 100; 714/36

(56) References Cited

U.S. PATENT DOCUMENTS

| | | | | |
|---|---|---|---|---|
| 4,614,945 A | * | 9/1986 | Brunius et al. | 340/870.03 |
| 4,794,368 A | * | 12/1988 | Grossheim et al. | 340/63 |
| 4,897,662 A | * | 1/1990 | Lee et al. | 343/701 |
| 4,959,860 A | * | 9/1990 | Watters et al. | 380/4 |
| 5,046,082 A | | 9/1991 | Zicker et al. | 379/59 |
| 5,142,691 A | * | 8/1992 | Freeburg et al. | 455/38.2 |
| 5,388,156 A | * | 2/1995 | Blackledge, Jr. et al. | 380/4 |
| 5,418,537 A | | 5/1995 | Bird | 342/357 |
| 5,574,786 A | * | 11/1996 | Dayan et al. | 380/4 |
| 5,635,940 A | | 6/1997 | Hickman et al. | |
| 5,712,973 A | * | 1/1998 | Dayan et al. | 395/186 |
| 5,748,084 A | * | 5/1998 | Isikoff | 340/568 |
| 5,757,271 A | * | 5/1998 | Andrews | 340/568 |
| 5,757,916 A | | 5/1998 | MacDoran et al. | |
| 5,963,142 A | * | 10/1999 | Zinsky et al. | 340/825.34 |
| 5,970,227 A | * | 10/1999 | Dayan et al. | 395/186 |
| 5,987,609 A | * | 11/1999 | Hasebe | 713/200 |
| 6,087,937 A | * | 7/2000 | McCarthy | 340/567 |

FOREIGN PATENT DOCUMENTS

| | | | | |
|---|---|---|---|---|
| EP | 0449242 | 10/1991 | | G06F/11/00 |
| EP | 0836131 | 4/1999 | | G06F/1/00 |

OTHER PUBLICATIONS

Brown, Bruce, "Stop Thief!", Computer Shopper, May 1997, pp. 232–233.

* cited by examiner

*Primary Examiner*—Thomas Lee
*Assistant Examiner*—Ilwoo Park
(74) *Attorney, Agent, or Firm*—Conley, Rose & Tayon, P.C.

(57) ABSTRACT

A computer security system whereby access is controlled by remote enablement or disablement. The system can be coupled with third-party products to accommodate satellite transmissions for long-distance access control.

15 Claims, 2 Drawing Sheets

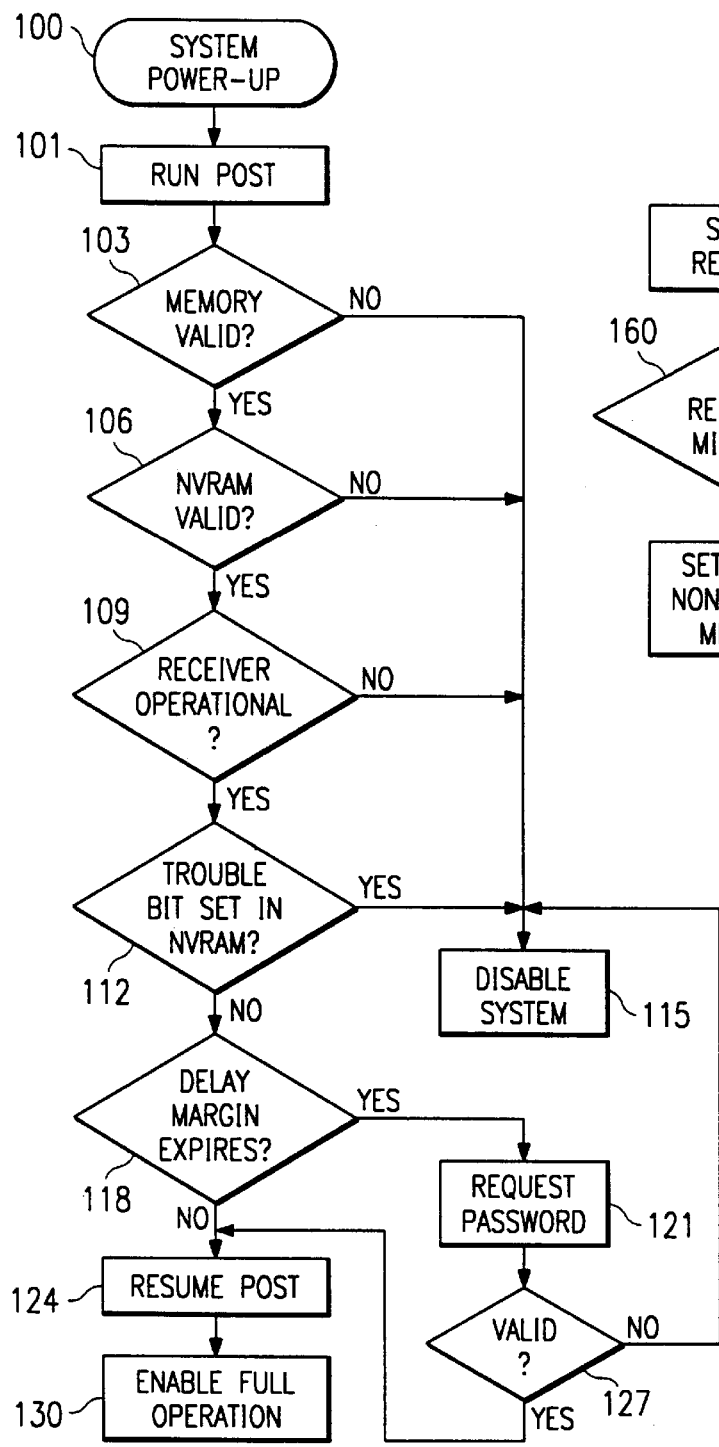
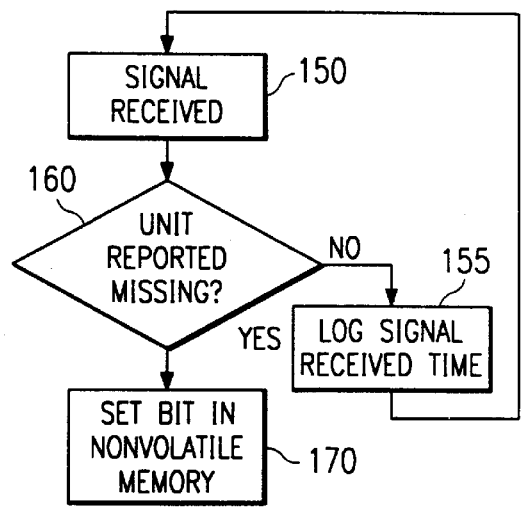
FIG. 1A
FIG. 1B

"J" SYSTEM FOR SECURING A PORTABLE COMPUTER WHICH OPTIONALLY REQUIRES AN ENTRY OF AN INVALID POWER ON PASSWORD (POP), BY FORCING AN ENTRY OF A VALID POP

BACKGROUND AND SUMMARY OF THE INVENTION

This invention relates to a method for computer security whereby commands can be sent remotely to the computer such that operation is enabled or disabled.

Background: High-Tech Equipment Theft

Physical computer equipment, and intellectual property stored on hard drives in portable computers, can be worth millions of dollars to the owner companies. Particularly where small, expensive, and portable computers are involved, asset management is becoming very difficult.

With the advent of the Internet and pervasiveness of computers in business and personal life, it is only natural that theft of such equipment, components, and information stored on these systems becomes more prevalent. Employees continue to be the primary source for losses due to theft. For example, employees who have compatible systems at home may be tempted to swap boards and input devices at work to repair their systems at home. Employees are not the only threat. Repairmen, janitors, delivery-persons, other contractors, customers, invited guests, and even security people themselves have an opportunity to take computer property.

Size and portability are also factors. As integrated circuit manufacturers reduce the size of chips with a complementary boost in performance and power, the boxes into which the chips are placed become smaller. Grab-and-run thefts are likely to focus on the smallest equipment. As computer equipment continues to decrease in size (e.g. sub-notebook and smaller computers), the chance of losing it to theft increases. The reduction in size certainly seems to be the way of the future.

Intellectual property comprises a significant part of company's asset portfolio. In many cases, the value of a piece of intellectual property far exceeds the value of the hardware on which is stored. Consequently, if the hardware is stolen, the ability to prevent access to that information is paramount, and return of the hardware is only a secondary objective. A survey of 325 U.S. companies by the American Society for Industrial Security concluded that potential losses to U.S. companies could total $24 billion a year.

Computers and related peripherals, and intellectual property are not the only target of high-tech theft. State-of-the-art instrumentation and test equipment are also prime candidates and are usually more expensive per unit volume than a typical home computer. Although less marketable than computer equipment, they can represent a sizeable loss to companies using such equipment.

Background: Prior Art Anti-Theft Systems

Companies are becoming increasingly concerned about the loss or illicit disclosure of corporate proprietary information. Protection of stored information is accomplished primarily by hard disk software security locks and data encryption. These measures are not absolutely theft-proof and in many cases can be defeated rather easily. Furthermore, once defeated, the system is useable. For example, theft of a laptop with a software protected hard disk can be defeated by simply swapping in a new or different compatible drive without the software protection—a small price to pay relative to the value of the whole system. Moreover, removal of the laptop computer to a different location will in many cases provide ample time to defeat the software locks and encryption employed to secure the information.

However, in some cases, the theft is for the value of the hardware and not the information contained on the system storage devices. Thus, most hardware security systems attempt to protect the computer system by fixing it to another less mobile object. However, once a security cable is removed, the computer is still fully operational and easily resalable.

These prior art measures are ineffective where the computer equipment has yet to be secured, for example, during shipment to the consumer or during assembly at the manufacturer. Furthermore, the conventional methods are ineffective against theft from a car or from the person. As mentioned before, as integrated circuits become smaller, the more functions that can be designed into a chip and the more densely populated a board becomes. Eventually, all electronic functions of the computer may be integrated into one board. Conventional theft protection methods do not provide the level of protection in these situations to discourage theft of a board or system.

One difficulty in preventing this problem is that most users are unwilling to go to the inconvenience of using passwords or other security measures. Therefore, although some of today's systems have POST passwords or encryption devices built in, very few of these features are actually enabled, and therefore it is difficult for companies to ensure that systems are secure. Currently, if such a system is lost or stolen while its security features are disabled, there is no way for the owner to prevent its unauthorized use.

The automotive industry has made some use of remotely-activated anti-theft devices. A popular system is called LoJack™, and is used to track stolen vehicles. To protect a car, a transmitter/receiver unit is attached in an inconspicuous place. If the car is stolen, the owner notifies the police. The police then remotely activate the transmitter, which sends a continuous signal allowing police to locate and recover the car. The disadvantage with this system is that the owner must first discover, and notify authorities, that the property has been stolen. Thus it is possible for the thieves to drive the vehicle away when the owner is not aware of the theft, and work for several hours at defeating the anti-theft device or stripping the car. Furthermore, a seasoned thief can easily disable or even remove the transmitter/receiver device, thereby defeating the effectiveness of this anti-theft system.

Other products use Global Positioning System ("GPS") satellites to let distressed drivers call for help or authorities to track stolen cars. The driver must connect a cellular phone installed in the vehicle and enter a pass-code when starting the car.

Further disadvantages of these and related systems are that the owner pays monthly service charges for use of the system. In other designs, it requires that the system be active, and plugged into a phone system. Up-front costs are high for parts and installation. In addition, many solutions reduce the ability to perform work and are subsequently not used.

In general, any remotely activated anti-theft add-on which is inoperative when the system is inoperative has a serious weakness: if the system can be physically removed while inoperative, a thief can take it to a shielded location and work at length on disassembling the system or removing the protection.

Remote Security Technology

The present invention incorporates a new type of security feature into the circuitry of a portable computer (or analogous equipment). The computer contains an RF receiver unit which is always active, even when the computer is not. If the computer is reported stolen, a signal is sent to the receiver to activate a security feature (such as boot password protection), even if the user had previously inactivated this security feature. When the computer is next turned on, this security feature will prevent the thief from making use of the computer.

This security architecture, in the presently preferred embodiment, does not permanently destroy operation of the system, but simply restores the system's built-in security protection options. This is done by setting a bit in nonvolatile memory, which thereafter makes the system require a password for access to operate the system. (If the user has not enabled password protection, he will have to get an emergency password from his system administrator or from technical support.) An important feature of this embodiment is that it is executed during the system Power-On Self-Test ("POST") procedure, and thus cannot be bypassed.

An advantage is that the feature can be coupled to existing third-party communication systems to allow a command to be received by the computer in order to disable operation to unauthorized owners. For example, Eagle Eye Technologies, Inc., builds a tracking system that is capable of locating a transponder to within 3 meters of its actual location. The present application uses a slightly different technique, based upon the same radio frequency (RF) interfacing hardware, to set an electronic key bit in non-volatile RAM of a computer (or a comparably complex mobile or portable unit) which impedes operation of the unit if a security command is sent. Thieves will be reluctant to steal a device with this feature.

Another advantage is obtained at a lower level. With the feature integrated onto the system board, the board itself can be disabled from operating. This prevents board swapping by employees to home computers.

Another advantage is the protection of user data at a higher level. Theft of proprietary information is more difficult in that one more barrier is added to the process. If the system is disabled, the thief must remove the storage unit and install it into a compatible system in order to steal the information.

Another advantage over prior art security systems is that systems are secure during shipment and while sitting in a warehouse. If a shipment disappears, its illegitimate operation can be disabled from any point in the country, or perhaps even the world.

Preferably the satellite receiver is always on, and thus can be commanded to set the security feature even if the system is powered down. This prevents thieves from taking a stolen computer into a shielded room to defeat its protection.

Another advantage is that the system can be secured after it has been lost or stolen, even if the original user did not take advantage of conventional security features.

BRIEF DESCRIPTION OF THE DRAWING

The disclosed inventions will be described with reference to the accompanying drawings, which show important sample embodiments of the invention and which are incorporated in the specification hereof by reference, wherein:

FIG. 1A shows a flowchart of the security control process.

FIG. 1B shows a flowchart of the security control process of the receiver system.

DETAILED DESCRIPTION OF THE PREFERRED EMBODIMENTS

Figure 1C:
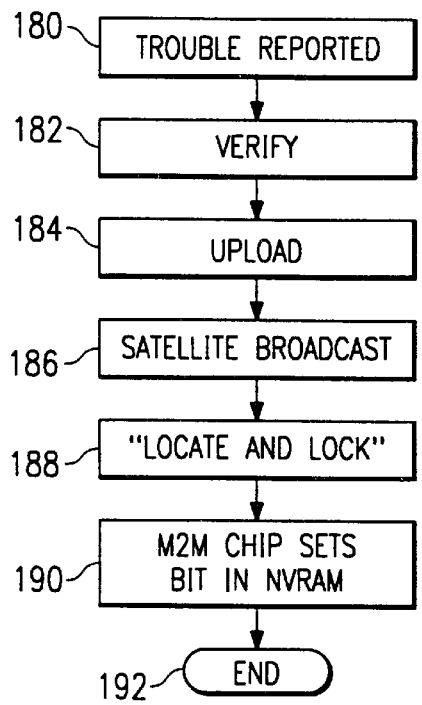
FIG. 1C shows a flowchart of the overall security control process once a device is determined stolen from the owner.

The numerous innovative teachings of the present application will be described with particular reference to the presently preferred embodiment (by way of example, and not of limitation), in which:

FIG. 1C shows a flowchart of the overall security control process once a device is determined stolen from the owner. Upon first notification from the owner that a device with the innovative embodiment has been stolen, the entity responsible for activating the security mechanism receives the stolen-property report and initiates the security process (step 180). Next, a verification process executes to ensure that owner is correctly identified with the appropriate piece of equipment (step 182). When the verification process is completed, the necessary commands are uploaded to a worldwide positioning system (step 184) for satellite broadcast to the device (step 186). A "locate and lock" sequence is executed (step 188) resulting in the device being disabled by the respective locking circuitry. In this case, a chip made by M2M, sets a bit in NVRAM (step 190) triggering the security querying process set forth below.

FIG. 1B shows a flowchart of action of the receiver portion of the security control process. This portion of the process is initiated by the reception of a signal (step 150). Whenever a signal is received by the security system, the signal is evaluated (step 160) to determine if that specific unit has been reported missing, and should therefore be locked. As long as the signal indicates that the unit is not missing, the security system will log a time that the last signal was received (step 155), then return to wait for the next signal. When the signal indicates that the unit has been reported missing, the system will set a bit in non-volatile memory to indicate that the unit should be disabled (step 170).

Note that the receiver circuit is always active, even when the system itself is turned off. Since this is the case, the disable signal can be sent at any time, and the system will be secured. As described below, the user may not be aware that the system is disabled until the next use.

FIG. 1A shows a flowchart of the security control process when the computer is activated. First, the user turns power on to the system (step 100). Shortly thereafter, the computer POST (step 101) procedure begins to execute. The system performs a memory test (step 103) and NVRAM test (step 106). If any of the memory checks fail, the system will be disabled (step 115). If the memory checks okay, the process continues with hardware checks of the receiver circuitry (step 109). If the trouble bit was set in NVRAM (step 112) either from a prior disabling command or by attempts to deactivate the circuitry, system operation remains disabled (step 115). If the receiver checks okay (step 109), the next step is to determine if a command has been received setting the trouble bit in NVRAM (step 112), disabling the system (step 115). If yes, the system is disabled (step 115). If not, the system verifies that a periodic enabling signal has been received within the required time delay margin (step 118), by comparing the time the last signal was received with the internal clock. If yes, the POST (step 124) procedure resumes and upon successful completion, enables full system operation (step 130). If the delay margin has expired (step 118), the system makes one more attempt to obtain the required password (step 121) and keep the system operational. If the password is invalid (step 127), the system is disabled (step 115). If the password is valid (step 127), the system remains fully operational (step 130). The authorization scheme is such that a denial-of-service situation is employed only in extreme cases.

Figure 2:
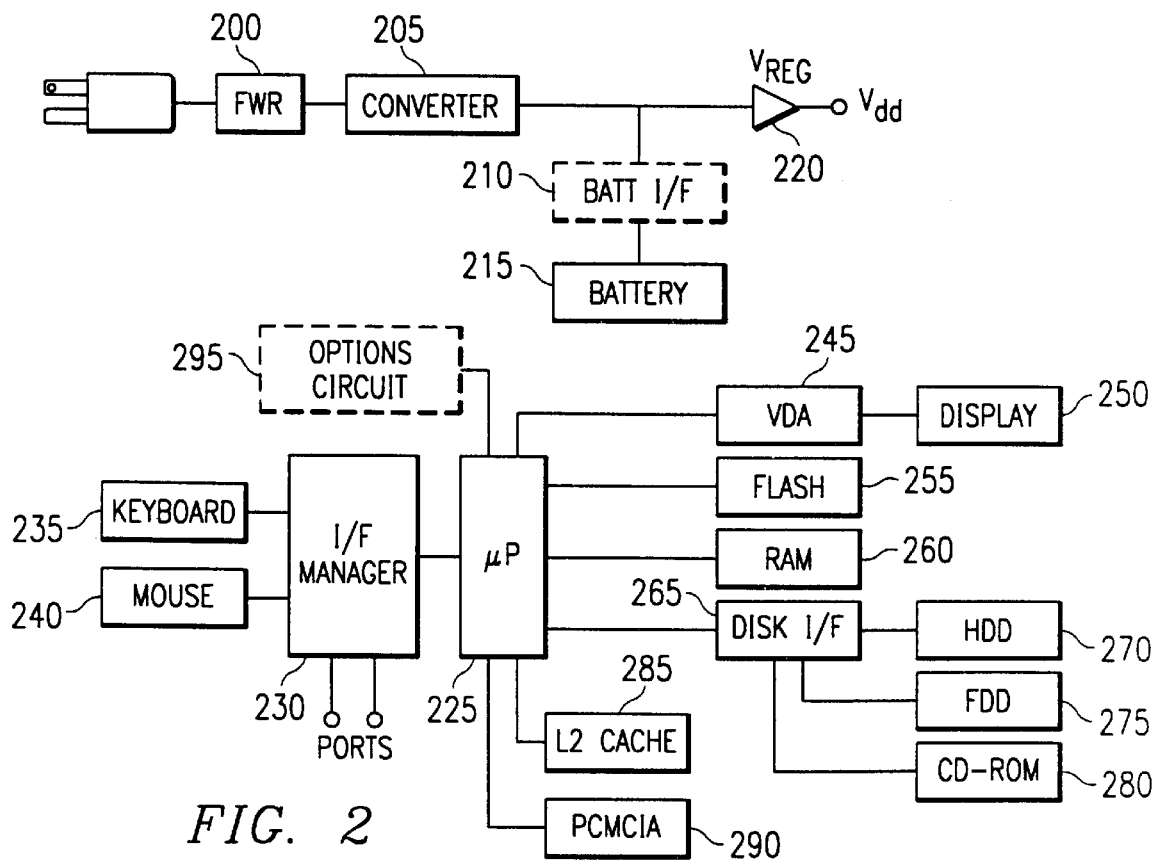
FIG. 2 shows a portable computer block diagram which can use the innovative remote security architecture.

FIG. 2 shows a portable computer which can use the innovative remote security architecture. The system includes a power converter 205 which is used to charge a battery 215. Optionally, a battery interface 210 is interposed between the battery and the rest of the circuitry. The power converter 205 is connected, through a full-wave bridge rectifier 200 to draw power from AC mains, and is connected to provide a DC voltage to the battery 215. The battery 215 (or the converter 205), connected through a voltage regulator 220, is able to power the complete portable computer system, which includes in this example:

- user input devices (e.g. keyboard 235 and mouse 240);
- at least one microprocessor 225 which is operatively connected to receive inputs from said input device, through an interface manager chip 230 (which also provides an interface to the various ports);
- a memory (e.g. flash memory 255 and RAM 260), which is accessible by the microprocessor;
- a data output device (e.g. display 250 and video display adapter card 245) which is connected to output data generated by microprocessor;
- a magnetic disk drive 270 which is read-write accessible, through an interface unit 265, by the microprocessor; and
- an electronic options circuit 295 for receiving current location information from a worldwide positioning system and selectively enabling or disabling operation of the computer system.

Optionally, of course, many other components can be included, and this configuration is not definitive by any means. For example, the portable computer may also include a CD-ROM drive 280 and floppy disk drive ("FDD") 270 which may interface to the disk interface controller 265. Additionally, L2 cache 285 may be added to speed data access from the disk drives to the microprocessor, and a PCMCIA 290 slot accommodates peripheral enhancements.

Alternative Embodiment: Motor Vehicles

Use of this innovative feature in motor vehicles allows authorities to disable operation of the vehicle upon notification of its theft, or for any other reason deemed necessary.

Alternative Embodiment: Cellular Telephones

Use of this innovative embodiment in expensive cellular telephones will provide a deterrent to theft. The ability to disable device operation when stolen from its rightful owner has a substantial impact on its value to a thief.

Alternative Embodiment: Asset Management

Asset management is often a problem in large companies. In a further class of embodiments, if a particular piece of equipment (e.g. a portable computer) cannot be found at inventory, the disclosed security system can be used to simply disable it. If the equipment has been legitimately transferred, the legitimate user will then be forced to call in for service, and the equipment can then be reactivated. (Of course appropriate precautions would be necessary before such a procedure could be applied to equipment which might cause harm by suddenly going out of service.)

Alternative Embodiment: Hi-Tech Instrumentation and Test Equipment

Implementations of this innovative feature into high-tech instrumentation will prohibit theft of this very costly type of equipment. Such components may include one or more programmable processors, and may have a system reset procedure into which the described security relations can be inserted.

According to another disclosed class of innovative embodiments, there is provided: A complex electronic system, comprising: at least one microprocessor operatively connected to detect inputs from an input device; a nonvolatile memory containing settings for administrative configurations; a memory which is connected to be read/write accessible by said microprocessor; input/output circuitry operatively connected to said microprocessor; and an RF receiver operatively connected to write to said nonvolatile memory, said receiver being receptive to a communication system; wherein said system includes at least one security feature which can be remotely activated by commanding said receiver, through said communication system, to modify at least one of said settings in said nonvolatile memory. Furthermore, said receiver may be configured to activate said security feature by selectably forcing said microprocessor into a reset procedure.

According to another disclosed class of innovative embodiments, there is provided: A system security method, comprising the steps of: (a.) receiving a security-activation command from an RF transmitting source; and (b.) selectively changing at least one administrative configuration options of a system to activate at least one security feature, based upon said command. In addition, said security method may also comprise the step of immediately forcing said system into a reset operation or locking or disabling the operation of said system.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

While activation of a boot password requirement is the preferred security feature, in alternative embodiments other security features can be activated instead. For example, one simple (but less preferred) choice is simply to lock down the system unconditionally. This is less preferred, since it is more likely to cause serious inconvenience to a legitimate user if erroneously activated.

In an alternative embodiment, rather than marking a bit in non-volatile memory, the system can permanently activate the security feature by blowing a fuse in a key circuit.

In an alternative embodiment, rather than marking a bit in non-volatile memory, the system can alternatively disable the hardware by blowing a fuse in a key circuit.)

In another alternative embodiment, rather than marking a bit in non-volatile memory, the system can alternatively set a bit in CMOS. However, this alternative is less preferred, since CMOS settings can be cleared by physically removing the CMOS backup battery.

In another alternative embodiment, the security feature can be checked at other times as well, e.g. when a plug-and-play update occurs, or whenever a wakeup from sleep mode occurs.

In other alternative embodiments, other security features can be used instead of or in addition to the boot passwording and/or lockdown features stated above.

Instead of noting the time a signal was received, the system can use a timer to determine if a valid signal was received within the allotted time period.

The above embodiment utilized a system in which a periodic signal is sent to the unit to ensure that communications are still possible. Alternatively, the POST program can initiate a request for a status check, then wait for a response.

The disclosed security system can be used in concert with other third-party communications products, such as global tracking systems to locate the system after theft.

What is claimed is:

1. A portable computer, which optionally requires entry of a valid Power On Password during system initialization and said computer is currently not requiring the entry thereof, comprising:
   a microprocessor;
   Power On Self Test (POST) code that is executed by said microprocessor during system initialization, said POST code can require a user to enter a Power On Password (POP) to enable system operation, and if the POST code requires a POP and a valid POP is not entered the computer will not complete system initialization and will be non-operational;
   an input/output device operatively coupled to said microprocessor; and
   a battery-backed wireless RF receiver operatively coupled to said microprocessor;
   wherein said computer implements a security mode which can be remotely activated either by transmitting a security command to said wireless RF receiver whether the computer is on or off or by the receiver failing to receive a periodic status signal; and
   wherein said security mode includes, if the computer is off when the security mode is activated, forcing a user to enter a valid POP the next time the computer is turned on.

2. The portable computer of claim 1 further including a nonvolatile memory coupled to said wireless RF receiver in which a bit is set to activate the security mode.

3. The portable computer of claim 1 wherein said security mode sets a bit in the nonvolatile memory, which blows a fuse in a logic circuit to require a valid POP to enable operation of the system.

4. The portable computer of claim 1 wherein, if the computer is in a sleep or suspend state when the security mode is activated, the user will be required to enter a valid POP to enable the computer when the computer transitions to a working state.

5. A method of securing a portable computer which optionally requires entry of a valid Power On Password during system initialization and said computer is currently not requiring the entry thereof, comprising:
   receiving a periodic security message from an RF transmitting source whether the computer is on or off; and
   activating a security mode either when the next of said periodic security messages is not received or when a security activation signal is received;
   wherein when the computer is off, responding to the activation of the security mode by requiring entry of a valid POP to enable system operation during subsequent system initialization.

6. The method of claim 5, wherein activating the security mode includes setting a bit in a nonvolatile memory and setting said bit can be performed even if the computer is off.

7. The method of claim 5 wherein activating the security mode includes blowing a fuse in a logic circuit to cause a bit in a non-volatile memory to be set, and blowing said fuse can be performed even if the computer is off.

8. The method of claim 5, wherein, if the computer is in a sleep, suspend or hibernation state when the security mode is activated, responding to the activation of the security mode by requiring a valid POP to enable the system operation during the subsequent transition to a working state from said sleep, suspend or hibernation state.

9. The method of claim 5, wherein when the computer is on, responding to the activation of the security mode by forcing a reset of the computer and requiring entry of a valid Power On Password (POP) to enable system operation during subsequent system initialization.

10. A portable computer, which optionally requires entry of a valid Power On Password during system initialization, comprising:
    a microprocessor;
    a nonvolatile memory device;
    a trouble bit within said nonvolatile memory device that identifies whether the portable computer runs in a normal mode or a security mode;
    a Power On Self Test (POST) code that is executed by said microprocessor during system initialization, said POST code can require a user to enter a Power On Password (POP) to enable system operation, and if the POST code requires a POP and a valid POP is not entered the computer will not complete system initialization and will be non-operational;
    an input/output device operatively coupled to said microprocessor; and
    a battery-backed wireless RF receiver operatively coupled to said microprocessor and to said trouble bit in nonvolatile memory;
    wherein said computer implements a security mode that is initiated by setting the trouble bit and which can be remotely activated either by transmitting a security command to said wireless RF receiver whether the computer is on or off or by the receiver failing to receive a periodic status signal; and
    wherein when said trouble bit is set, if the computer is on when the security mode is activated, the computer is disabled by forcing the computer to perform a system reset and requiring a user to enter a valid POP, or, if the computer is off when the trouble bit is set, forcing a user to enter a valid POP the next time the computer is turned on.

11. The portable computer of claim 10 wherein, if the computer is in a sleep or suspend state when the security mode is activated, the user will be required to enter a valid POP to enable the computer when the computer transitions to a working state.

12. The portable computer of claim 11 wherein said security mode blows a fuse in a logic circuit to require a valid POP to enable operation of the system.

13. A method of securing a portable computer which optionally requires entry of a valid Power On Password during system initialization, comprising:

receiving a periodic security message from an RF transmitting source whether the computer is on or off; and activating a security mode either when the next of said periodic security messages is not received or when a security activation signal is received; and enabling said security mode by setting a bit in nonvolatile memory;

responding to the setting of said bit by
  I. when the computer is off, requiring entry of a valid POP to enable system operation during subsequent system initialization; or
  ii. when the computer is on, forcing a reset of the computer and requiring entry of a valid Power On Password (POP) to enable system operation during subsequent system initialization.

14. The method of claim 13 wherein activating the security mode includes blowing a fuse in a logic circuit to cause the bit in nonvolatile memory to be set, and blowing said fuse can be performed even if the computer is off.

15. The method of claim 14, wherein, if the computer is in a sleep, suspend or hibernation state when the security mode is activated, responding to the activation of the security mode by requiring a valid POP to enable the system operation during the subsequent transition to a working state from said sleep, suspend or hibernation state.

* * * * *

UNITED STATES PATENT AND TRADEMARK OFFICE
CERTIFICATE OF CORRECTION

PATENT NO. : 6,418,533 B2
DATED : July 9, 2002
INVENTOR(S) : Michael F. Angelo et al.

It is certified that error appears in the above-identified patent and that said Letters Patent is hereby corrected as shown below:

Title page,
Item [54], Title, should read -- SYSTEM FOR SECURING A PORTABLE COMPUTER, WHICH OPTIONALLY REQUIRES AN ENTRY OF A VALID POWER ON PASSWORD (POP), BY FORCING AN ENTRY OF A VALID POP --;

Column 7,
Line 50, change "claim 1" to read -- claim 2 --; and

Column 9,
Line 9, change "I. when" to read -- i. when --.

Signed and Sealed this

Second Day of May, 2006

JON W. DUDAS
*Director of the United States Patent and Trademark Office*